(12) United States Patent
Marupaduga et al.

(10) Patent No.: US 10,028,323 B1
(45) Date of Patent: Jul. 17, 2018

(54) WIRELESS NETWORK ACCESS POINT TO SELECT A DEVICE-TO-DEVICE COMMUNICATION MASTER FOR A DEVICE-TO-DEVICE COMMUNICATION GROUP

(71) Applicant: Sprint Communications Company L.P., Overland Park, KS (US)

(72) Inventors: Sreekar Marupaduga, Overland Park, KS (US); Saravana Velusamy, Olathe, KS (US); Vanil Parihar, Overland Park, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 59 days.

(21) Appl. No.: 15/277,870

(22) Filed: Sep. 27, 2016

(51) Int. Cl.
| | | |
|---|---|---|
| *H04W 76/14* | (2018.01) | |
| *H04W 76/02* | (2009.01) | |
| *H04W 4/08* | (2009.01) | |
| *H04W 8/22* | (2009.01) | |
| *H04B 17/318* | (2015.01) | |
| *H04W 28/02* | (2009.01) | |
| *H04W 84/04* | (2009.01) | |
| *H04W 84/12* | (2009.01) | |
| *H04W 88/04* | (2009.01) | |

(52) U.S. Cl.
CPC .......... *H04W 76/14* (2018.02); *H04B 17/318* (2015.01); *H04W 4/08* (2013.01); *H04W 8/22* (2013.01); *H04W 28/0278* (2013.01); *H04W 76/023* (2013.01); *H04W 84/045* (2013.01); *H04W 84/12* (2013.01); *H04W 88/04* (2013.01)

(58) Field of Classification Search
CPC ....... H04W 76/023; H04W 4/08; H04W 8/22; H04W 84/12; H04W 84/045; H04W 88/04; H04W 76/14; H04W 28/0278; H04B 17/318
See application file for complete search history.

(56) References Cited

U.S. PATENT DOCUMENTS

| 2010/0202420 | A1* | 8/2010 | Jersenius | ............... | H04L 47/10 |
| | | | | | 370/337 |
| 2011/0143765 | A1* | 6/2011 | Moulsley | .......... | H04W 72/1252 |
| | | | | | 455/450 |
| 2015/0230224 | A1* | 8/2015 | Maaref | .................. | H04W 4/08 |
| | | | | | 455/451 |
| 2015/0282234 | A1* | 10/2015 | Sartori | ................ | H04W 76/023 |
| | | | | | 370/329 |
| 2015/0334756 | A1* | 11/2015 | Lu | ....................... | H04W 76/023 |
| | | | | | 370/329 |

(Continued)

*Primary Examiner* — Edan Orgad
*Assistant Examiner* — Ivan O Latorre

(57) ABSTRACT

A wireless network access point and User Equipment (UEs) communicate over Base Station-to-Device (BS2D) traffic links. The wireless network access point receives status reports from the UEs that form a Device-to-Device (D2D) communication group. The wireless network access point filters the UEs in the D2D communication group based on a signal strength threshold and a buffer capacity threshold to identify a candidate set of the UEs. The wireless network access point further prioritizes the candidate set based on buffer status reporting frequency of the UEs to select one of the UEs as the D2D communication master for the D2D communication group.

20 Claims, 7 Drawing Sheets

(56) References Cited

U.S. PATENT DOCUMENTS

| | | | |
|---|---|---|---|
| 2015/0358981 A1* | 12/2015 | Chae | H04W 72/085 |
| | | | 370/252 |
| 2016/0014794 A1* | 1/2016 | Wu | H04W 72/10 |
| | | | 370/329 |
| 2016/0044737 A1* | 2/2016 | Kwon | H04W 76/028 |
| | | | 370/328 |
| 2016/0073392 A1* | 3/2016 | Byun | H04W 72/048 |
| | | | 370/280 |
| 2016/0227463 A1* | 8/2016 | Baligh | H04W 40/02 |
| 2016/0227518 A1* | 8/2016 | Li | H04W 72/042 |
| 2016/0373970 A1* | 12/2016 | Kulal | H04W 36/0016 |
| 2017/0013661 A1* | 1/2017 | Kalhan | H04W 72/0493 |
| 2017/0164229 A1* | 6/2017 | Callard | H04W 28/0278 |
| 2017/0290028 A1* | 10/2017 | Lee | H04W 72/12 |
| 2017/0353950 A1* | 12/2017 | Song | H04W 72/048 |

\* cited by examiner

WIRELESS NETWORK ACCESS POINT TO SELECT A DEVICE-TO-DEVICE COMMUNICATION MASTER FOR A DEVICE-TO-DEVICE COMMUNICATION GROUP

TECHNICAL BACKGROUND

User Equipment (UEs) and wireless network access points exchange control signaling and user data over wireless links. The wireless exchange of control signaling and user data occurs using various wireless protocols, such as Long Term Evolution (LTE), Code Division Multiple Access (CDMA), Global System for Mobile communications (GSM) networks. EVolution Data Optimized (EVDO), and High Speed Packet Access (HSPA).

Wireless protocols, such as LTE-Advanced include the capability for UEs to engage in Device-to-Device (D2D) communications directly with one another instead of through the wireless network access point or base station. The UEs in a D2D communication group are usually in close proximity. By having the UEs communicate directly with one another, D2D communication reduces the load on a wireless network access point. In addition, by having fewer communication links, D2D communication also reduces the overall level of interference.

Typically, the wireless access point allocates traffic channels to the UEs for use in D2D communications, while the UEs maintain signaling links to the wireless access point. A D2D communication group will generally have a D2D master, which is a UE that maintains communication with the wireless access point or base station for the D2D communication group. Typically, the D2D master device is selected based on signal strength, with the device with the strongest signal strength being selected as the D2D master for the D2D communication group.

TECHNICAL OVERVIEW

A wireless network access point receives status reports from User Equipment (UEs) that form a Device-to-Device (D2D) communication group. The wireless network access point filters the D2D communication group based on a signal strength threshold to identify a candidate set of UEs. The wireless network access point may further filter the D2D communication group based on a buffer capacity threshold. The wireless network access point further prioritizes the candidate set based on buffer status reporting frequency to select one of the UEs as the D2D communication master for the D2D communication group.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
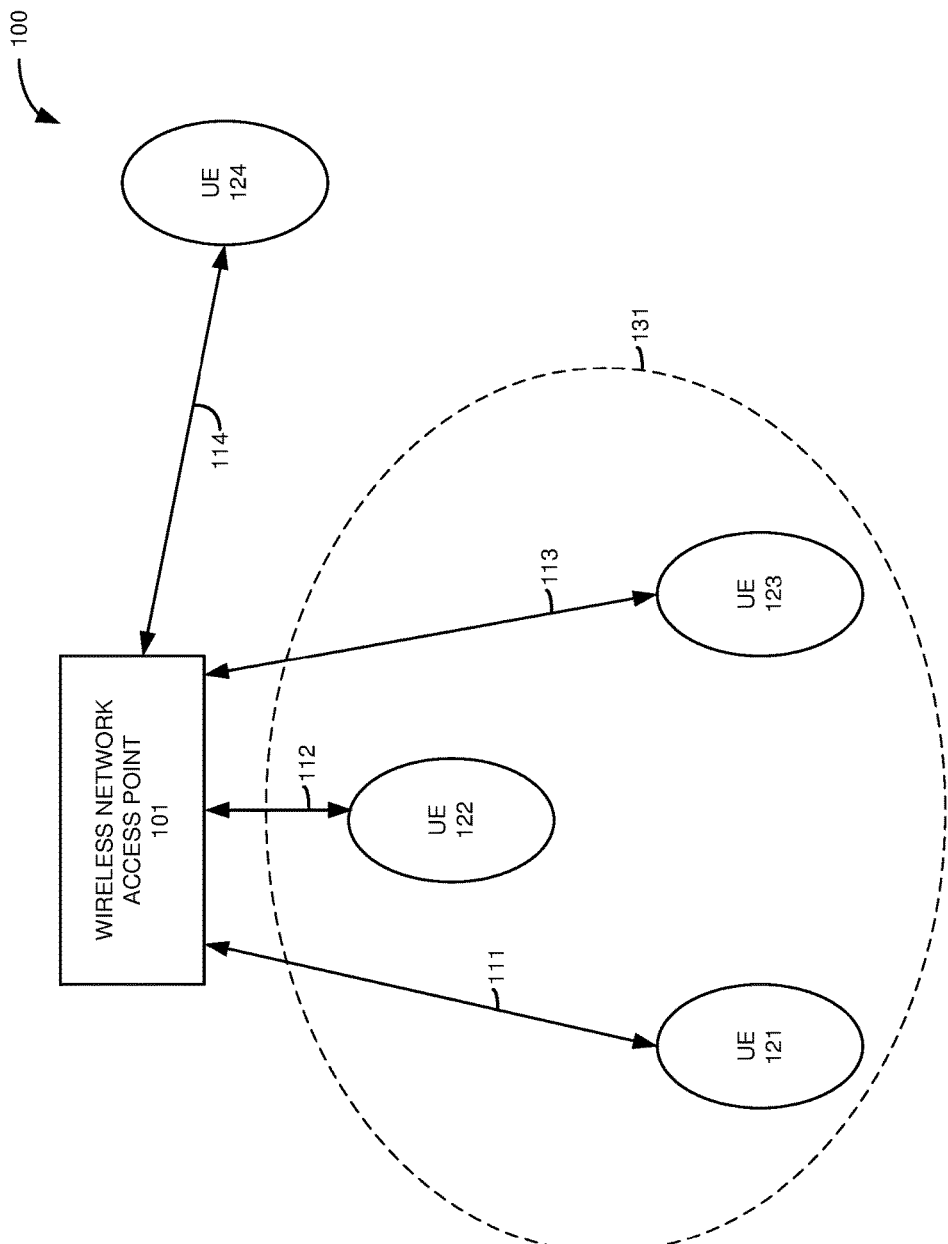
FIG. 1 illustrates a wireless network access point to select a Device-to-Device (D2D) communication master for a D2D communication group.

FIG. 1 illustrates wireless communication system 100 to select a Device-to-Device (D2D) master in a D2D communication group. Wireless communication system 100 includes wireless network access point 101 and User Equipment (UEs) 121-124. UEs 121-123 form D2D communication group 131. UEs 121-124 communicate with wireless network access point 101 over communication links 111-114, respectively. Wireless network access point 101 may have backhaul connectivity to one or more core networks over various wired and/or wireless data connections. Some conventional aspects of wireless network access point 101 and UEs 121-124 are omitted for clarity, such as enclosures, power supplies, and the like.

Communication links 111-114 comprise BS2D traffic links and may use any of a variety of communication media, such as air, metal, optical fiber, or any other signal propagation path, including combinations thereof. Also, the links may use any of a variety of communication protocols, such as Internet, telephony, optical networking, wireless communication, wireless fidelity, Long Term Evolution (LTE), Code Division Multiple Access (CDMA), worldwide interoperability for microwave access, or any other communication protocols and formats, including combinations thereof. Further, the links could be direct links or they might include various intermediate components, systems, and networks.

User data and control signaling are transferred over communication links 111-114. Communication links 111-114 have forward components (from base station to user) and reverse components (from user to base station). Note that communication links 111-114 are referred to as Base Station-To-Device (BS2D) links because they couple wireless network access point/base station 101 and UEs 121-124.

Wireless network access point 101 comprises a Long Term Evolution (LTE) evolved Node B (eNodeB), LTE relay, 5G base station, Wireless Fidelity (WIFI) hotspot, LTE/WIFI Aggregation (LWA) node, or some other wireless access point. Examples of UEs 121-124 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, wireless network access point 101 receives status reports from UEs 121-123 that form D2D communication group 131. In some examples, UEs 121-123 report on systems conditions, such as signal strength, signal to noise ratio, inter-cell interference, intra-cell interference, control signaling usage, and user data transfers. Although UE 124 is not part of D2D communication group 131, wireless network access point 101 may also receive a status report from UE 124.

Wireless network access point 101 filters UEs 121-123 in D2D communication group 131 based on a signal strength threshold to identify a candidate set of UEs. For instance, there may be a minimum required signal strength for a UE to serve as the D2D communication master for the D2D communication group. Although not required, wireless network access point 101 may also filter the UEs in a D2D communication group based on a buffer capacity threshold.

Wireless network access point 101 further prioritizes the candidate set based on buffer status reporting frequency to select one of the UEs 121-123 as the D2D communication master for D2D communication group 131. In some examples, wireless network access point 101 may prioritize a UE with a lower signal strength that has a lower buffer status reporting frequency. The lower buffer status reporting frequency may indicate that the UE has fewer errors.

Figure 2:
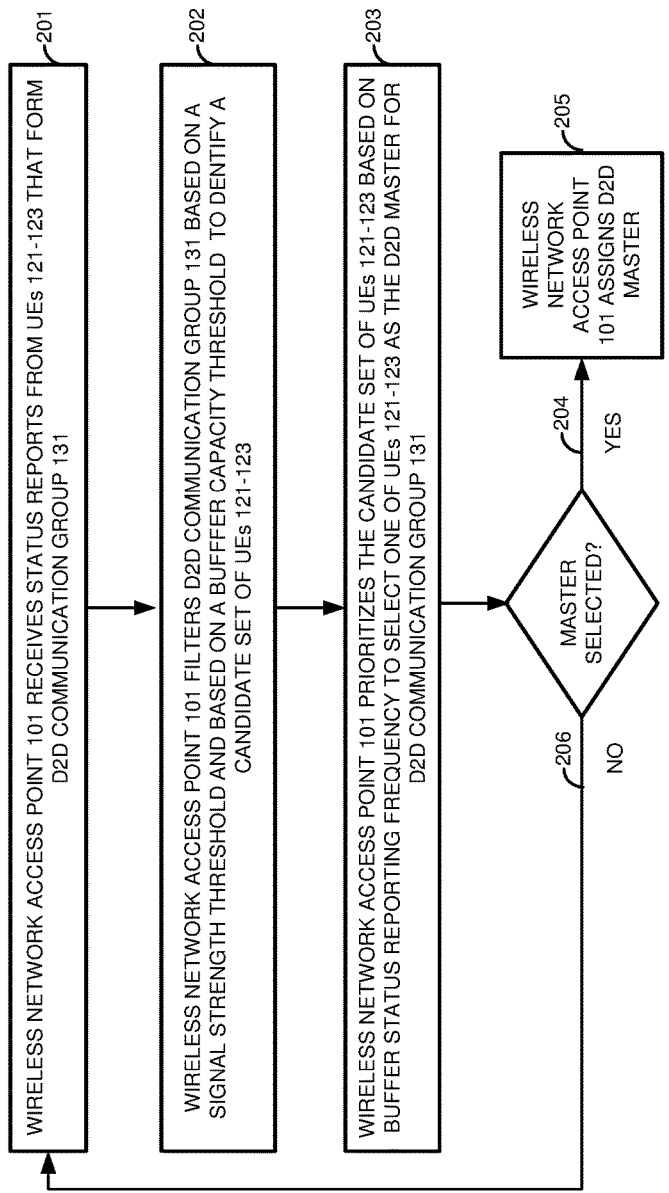
FIG. 2 illustrates the operation of the wireless network access point to select the D2D communication master for the D2D communication group.

FIG. 2 illustrates the operation of wireless communication system 100 to select the D2D master in D2D communication group 131. In some examples, wireless network access point 101 selects and implements D2D communication in response to high inter and/or intra cell interference. In other examples, wireless network access point 101 selects and implements D2D communication in response to high amounts of control signaling—especially on reverse signaling links.

Wireless network access point 101 receives status reports from UEs 121-123 that form D2D communication group 131 (201). For example, UEs 121-124 transfer status reports over the reverse components of communication links 111-114, respectively. UEs 121-123 in D2D communication group 131 may be selected based on proximity, user request, device capability, radio conditions, and/or other factors.

Wireless network access point 101 filters D2D communication group 131 based on a signal strength threshold to identify a candidate set of UEs (202). Although not required, the filtering may also be based on a buffer capacity threshold. Wireless network access point 101 further prioritizes the candidate set based on buffer status reporting frequency to select one of the UEs 121-123 as the D2D communication master for D2D communication group 131 (203). If a D2D communication master is selected (204), then wireless network access point 101 assigns the selected UE as the D2D communication master (205). For example, wireless network access point 101 may transfer signaling to the selected UE over the forward component of the communication link. Once the D2D communication master is assigned, UEs 121-123 exchange user data using the master device and continue to exchange signaling with wireless network access point 101.

If a D2D communication master is not selected (206), then wireless network access point 101 continues to exchange signaling and user data with UEs 121-123 over communication links 111-114, respectively. Although not required, wireless network access point 101 may restart the selection process (201). In some examples, the selection process is repeated after the expiration of a timer or if the configuration of UEs in D2D communication group 131 changes.

Figure 3:
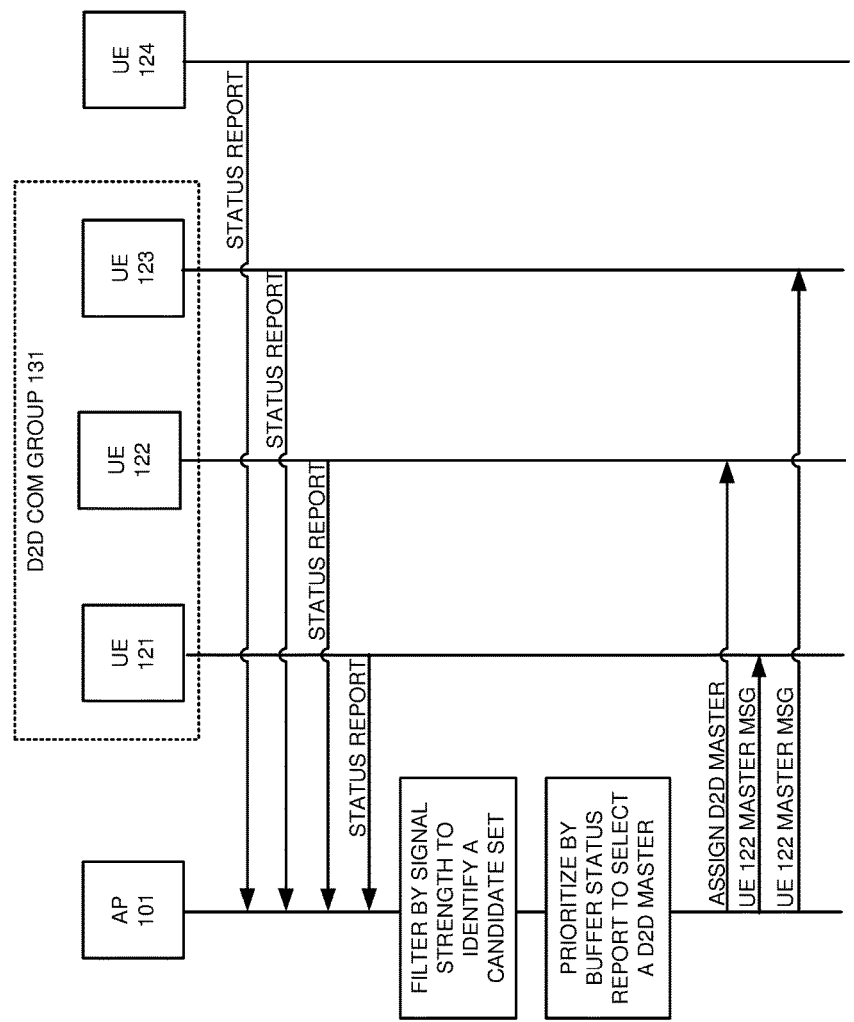
FIG. 3 illustrates the operation of the wireless network access point to select the D2D communication master for the D2D communication group.

FIG. 3 illustrates the operation of wireless network access point 101 to select the D2D communication master for D2D communication group 131. Wireless network access point 101 receives status reports from UEs 121-123 that form D2D communication group 131. Although UE 124 is not part of D2D communication group 131, wireless network access point 101 may also receive a status report from UE 124.

Wireless network access point 101 filters the UEs in D2D communication group 131 based on a signal strength threshold to identify a candidate set of UEs. For example, UE 121 has the strongest signal strength, followed by UE 122, and UE 123 has a signal strength below the signal strength threshold; then the candidate list would be UE 121 and UE 122, ranked according to signal strength. Wireless network access point 101 further prioritizes the candidate set based on buffer status reporting frequency to select one of the UEs 121-122 as the D2D communication master for D2D communication group 131.

For example, UE 122 may have a lower buffer status reporting frequency than UE 121, so although UE 121 has a stronger signal strength than UE 122, UE 122 is selected as the D2D communication master for D2D communication group 131. In some examples, different weights may be applied to the buffer status reporting frequency and signal strength. Wireless network access point 101 assigns UE 122 as the D2D communication master for D2D communication group 131. Wireless network access point 101 transfers an indication of the D2D master to UEs 121-123.

Figure 4:
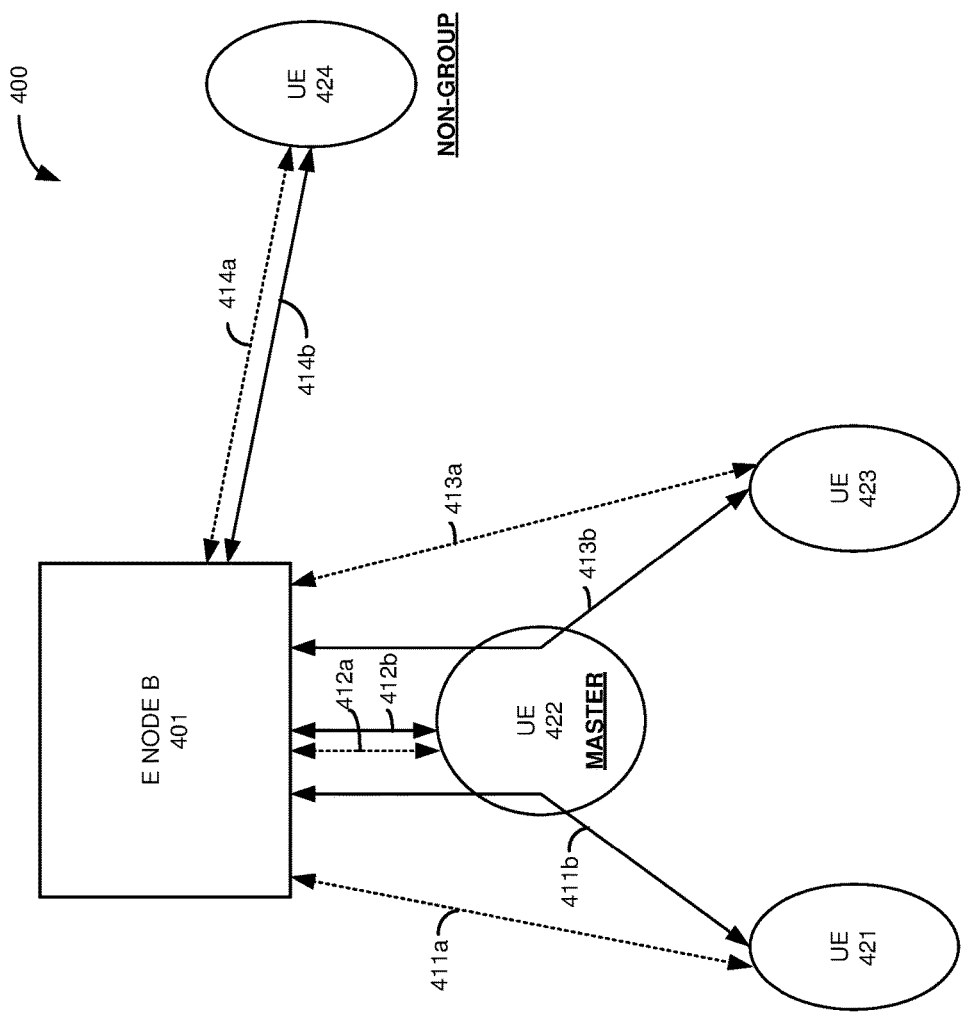
FIG. 4 illustrates an Evolved Node B (eNode B) to select a D2D communication master for a D2D communication group.

FIG. 4 illustrates wireless communication system 400 to select a D2D communication master for a D2D communication group. In some examples, eNode B 401 selects and implements D2D communication in response to high amounts of user data traffic—especially on reverse traffic links.

ENode B 401 receives status reports from UEs 421-423 that form a D2D communication group. Although UE 424 is not part of the D2D communication group, eNode B 401 may also receive a status report from UE 424. In some examples, UE 424 may be in another D2D communication group, not shown for clarity.

ENode B 401 filters UEs 421-423 in the D2D communication group based on a signal strength threshold to identify a candidate set of UEs. For example, the signal strength threshold may be the minimum signal strength required for a UE to operate as a D2D communication master. UEs 421-423 may further be filtered according to a buffer capacity threshold. In some examples, the buffer capacity threshold is a minimum buffer capacity. In other examples, the buffer capacity threshold is a minimum available buffer capacity.

ENode B 401 prioritizes the candidate set based on buffer status reporting frequency to select one of the UEs 421-423 as the D2D communication master for the D2D communication group. For example, a high buffer status reporting frequency may indicate frequent errors or a low buffer capacity. In some examples, if the selected UE can no longer be the D2D communication master, another UE is selected from the candidate set. For example, the next UE on the candidate set may be selected.

In response, UEs 421-423 wirelessly exchange user data over D2D traffic links 411b and 413b. In some examples, UEs 421-423 wirelessly exchange control signaling over BS2D signaling links 411a-413a. Typically, eNode B 401 signals the time/frequency parameters for D2D links 411b and 413b to UEs 421-423, although UEs 421-423 may handle some of this task. The user data transfer over D2D links 411b and 413b, which has forward and reverse components. D2D links 411b and 413b comprise bi-directional wireless links between UEs 421-423. In some examples, D2D links 411a and 413b provide transport for signaling links 412a and 413a.

Figure 5:
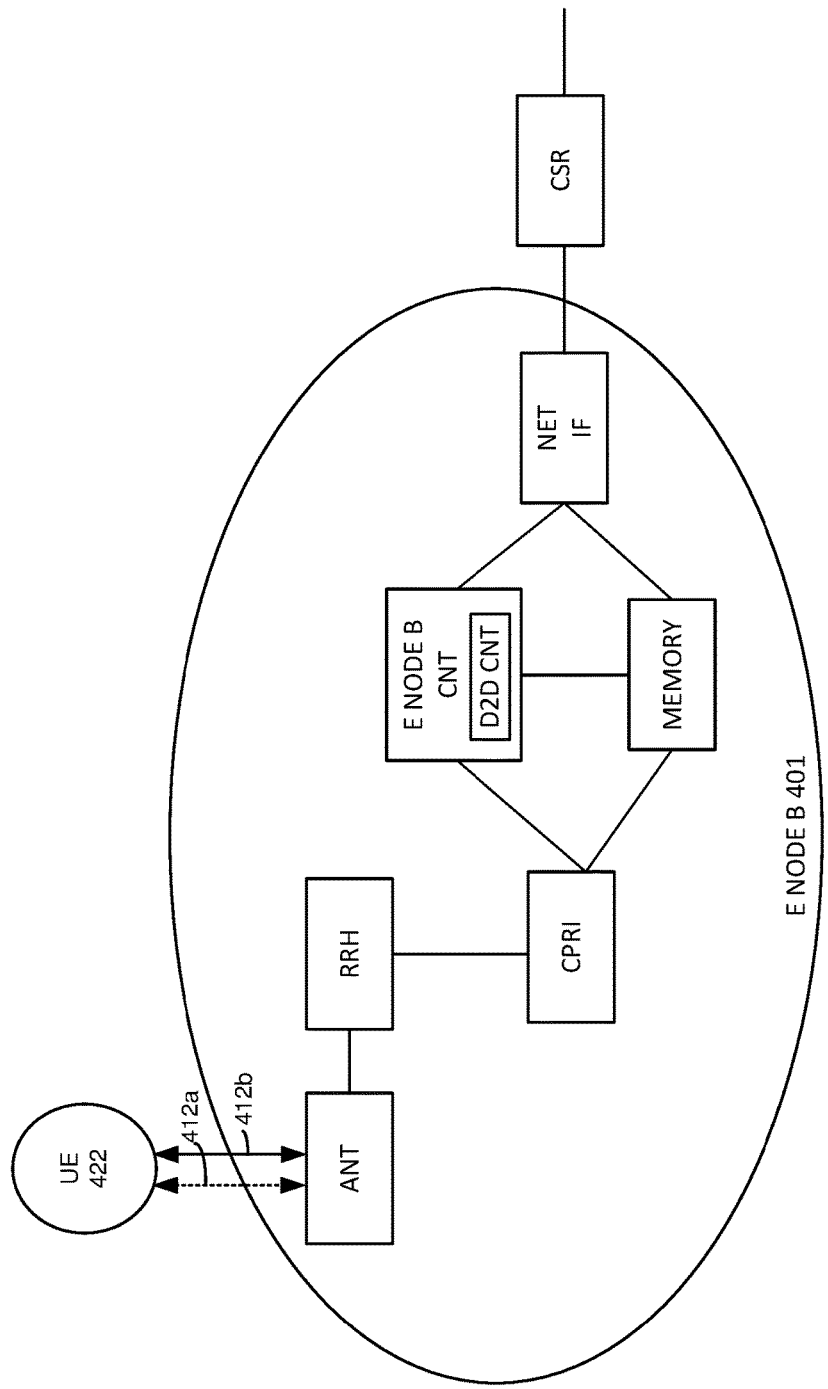
FIG. 5 illustrates the eNode B to select the D2D communication master for the D2D communication group.

FIG. 5 illustrates eNode B 401 to select the D2D communication master for the D2D communication group. ENode B 401 comprises an antenna (ANT), remote radio head (RRH), Common Public Radio Interface (CPRI), eNode B controller, D2D controller, network interface (NET IF), and cell site router (CSR). Although the D2D controller is shown to be within the eNode B controller, the D2D controller may be a separate element. The D2D controller may be implemented using software and/or circuitry. The D2D controller processes the status reports sent by the UEs to select the D2D communication master for the D2D communication group. UE 422 performs the role of D2D communication master for the D2D communication group, not shown for clarity.

Figure 6:
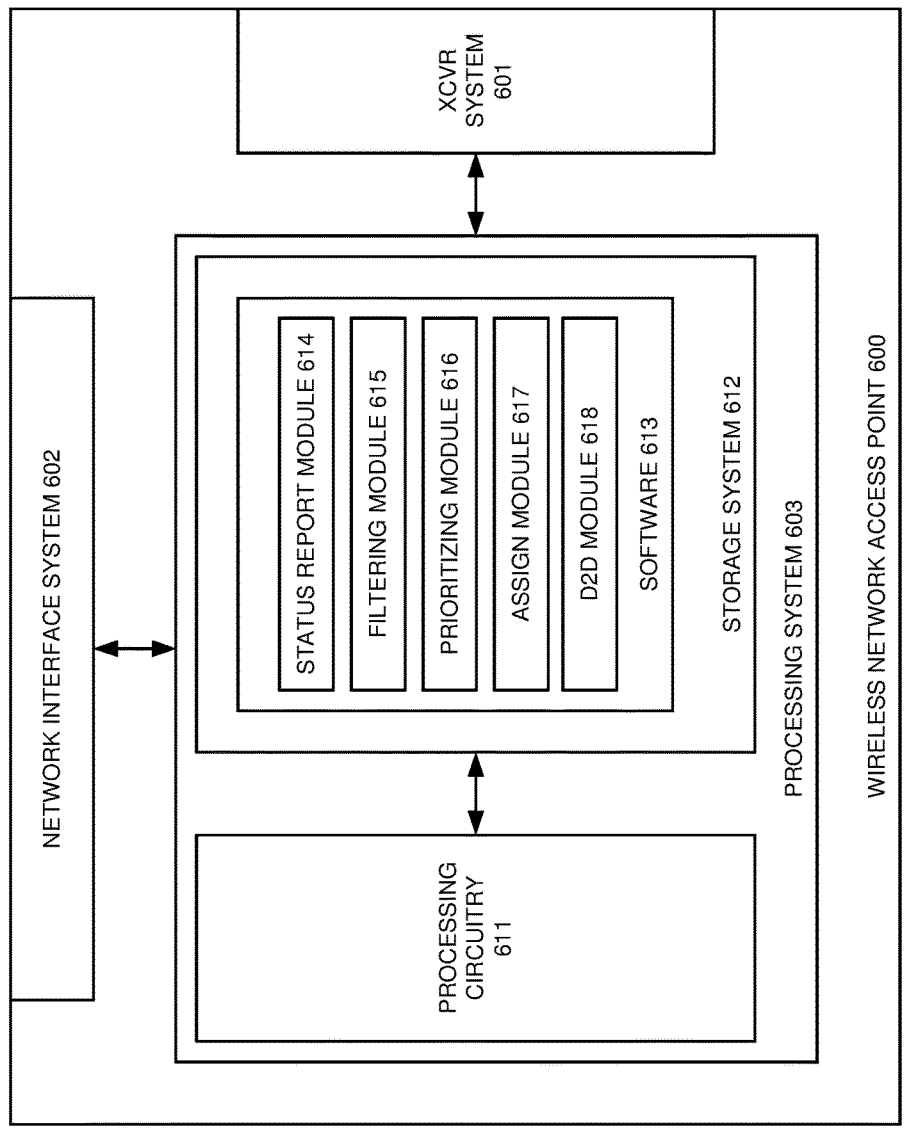
FIG. 6 illustrates an example of a wireless network access point.

FIG. 6 illustrates wireless network access point 600. Wireless network access point 600 is an example of wireless network access point 101 and eNode B 401, although these systems may use alternative configurations and operations. Wireless network access point 600 comprises transceiver system 601, network interface system 602, and processing system 603. Processing system 603 includes processing circuitry 611 and storage system 612 that stores software 613. Software 613 comprises software modules 614-618.

Transceiver system 601 comprises components that communicate over communication links such as network cards, ports, RF transceivers, processing circuitry and software, or some other communication components. Transceiver system 601 may be configured to communicate over metallic, wireless, or optical links. Transceiver system 601 may be configured to use TDM, IP, Ethernet, optical networking, wireless protocols, communication signaling, or some other communication format—including combinations thereof. Transceiver system 601 may receive status reports and transfer signaling indicating a D2D communication master. Transceiver system 601 may also be configured to communicate using wireless communication protocols such as LTE.

Network interface system 602 comprises backhaul communication components, such ports, routers, circuitry, memory, software, and the like. Network interface system 602 uses protocols such as LTE, CDMA, GSM, EVDO, HSPA, IP, Ethernet, DOCSIS, or some other communication format. Network interface system 602 exchanges user data and control signaling with one or more core networks.

Processing circuitry 611 comprises microprocessor and other circuitry that retrieves and executes operating software 613 from storage system 612. Processing circuitry 611 may comprise a single device or could be distributed across multiple devices—including devices in different geographic areas. Processing circuitry 611 may be embedded in various types of equipment. Examples of processing circuitry 611 include central processing units, application-specific processors, logic devices, and/or any type of computer processing devices—including combinations thereof.

Storage system 612 comprises a non-transitory computer readable storage medium readable by processing system 603 and capable of storing software 613, such as a disk drive, flash drive, data storage circuitry, or some other hardware memory apparatus—including combinations thereof. Storage system 612 can include volatile and non-volatile, removable and non-removable media implemented in any method or technology for storage of information, such as computer readable instructions, data structures, program modules, or other data—including combinations thereof. Storage system 612 may comprise a single device or could be distributed across multiple devices—including devices in different geographic areas. Storage system 612 may be embedded in various types of equipment. In some examples, a computer apparatus could comprise storage system 612 and software 613.

Software 613 comprises computer programs, firmware, or some other form of machine-readable processing instructions. Software 613 may include an operating system, utilities, drivers, network interfaces, applications, or some other type of software. In this example, software 613 comprises status report module 614, filtering module 615, prioritizing module 616, assign module 617, and D2D module 618. Although software 613 could have alternative configurations in other examples.

Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603.

When executed, software 613 directs processing system 603 to operate as described herein to select a D2D communication master for a D2D communication group. In particular, status report module 614 directs processing system 603 to wirelessly receive status reports from the UEs. Filtering module 615 directs processing system 603 to filter the UEs in a D2D communication group based on a signal strength threshold to identify a candidate set for the D2D communication master. The UEs in the D2D communication group may also be filtered based on a buffer capacity threshold. Prioritizing module 616 directs processing system 603 to prioritize the candidate set based on buffer status reporting frequency. Assign module 617 directs processing system 603 to select and assign on of the UEs as the D2D communication master for the D2D communication group. D2D module 618 directs processing system 603 to transferring D2D signaling data to the UEs.

Figure 7:
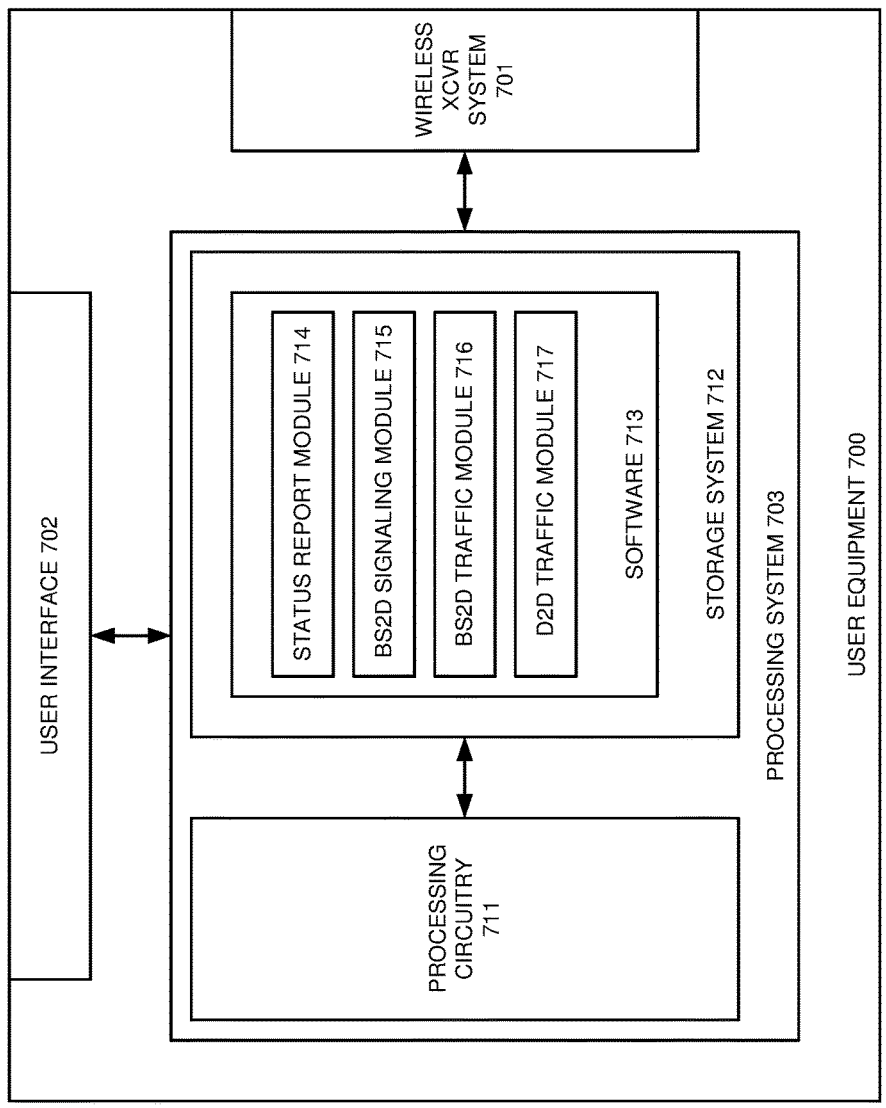
FIG. 7 illustrates an example of a User Equipment (UE).

FIG. 7 illustrates User Equipment (UE) 700. UE 700 is an example of UEs 121-124 and UEs 421-424, although UEs 121-124 and UEs 421-424 could use alternative configurations. UE 700 comprises wireless communication transceiver system 701, user interface 702, and processing system 703. Processing system 703 is linked to wireless communication transceiver system 701 and user interface 702. Processing system 703 includes processing circuitry 711 and storage system 712 that stores software 713.

UE 700 may include other well-known components such as a battery and enclosure that are not shown for clarity. UE 700 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 701 comprises Radio Frequency (RF) communication circuitry and an antenna. The RF communication circuitry typically includes an amplifier, filter, RF modulator, and signal processing circuitry. Wireless communication transceiver system 701 may also include a memory device, software, processing circuitry, or some other communication device. Wireless communication transceiver system 701 may use various communication formats, such as LTE, CDMA, EVDO, WIMAX, GSM, WIFI, HSPA, or some other wireless communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 711 comprises microprocessor and other circuitry that retrieves and executes software 713 from storage system 712. Storage system 712 comprises a non-transitory storage medium, such as a disk drive, flash drive, data storage circuitry, or some other memory apparatus. Processing circuitry 711 is typically mounted on a circuit board that may also hold storage system 712, portions of wireless communication transceiver system 701, and user interface 702.

Software 713 comprises computer programs, firmware, or some other form of machine-readable processing instructions. Software 713 may include an operating system, utilities, drivers, network interfaces, applications, or some other type of software. When executed by processing circuitry 711, software 713 directs processing system 703 to operate user equipment 700 as described herein.

When executed, software 713 directs processing system 703 to operate as described herein to select a D2D communication master for a D2D communication group. In particular, status report module 714 directs processing system 703 to determine status and generate and transfer the status reports to a wireless network access point. BS2D signaling module 715 directs processing system 703 to exchange signaling over BS2D links as described herein—including the integration of multiple links. BS2D traffic module 716 directs processing system 703 to exchange user data over BS2D links as described herein—including the integration of multiple links. D2D traffic module 717 directs processing system 703 to exchange user data over D2D links as described herein—including the integration of multiple links.

Referring back to FIG. 1, UEs 121-124 comprise Radio Frequency (RF) communication circuitry and an antenna. The RF communication circuitry typically includes an amplifier, filter, modulator, and signal processing circuitry. UEs 121-124 may also include a user interface, memory device, software, processing circuitry, or some other communication components. UEs 121-124 may be a telephone, computer, e-book, mobile Internet appliance, wireless network interface card, media player, game console, or some other wireless communication apparatus—including combinations thereof.

Wireless network access point 101 comprises RF communication circuitry and an antenna. The RF communication circuitry typically includes an amplifier, filter, RF modulator, and signal processing circuitry. Wireless network access point 101 may also comprise routers, servers, switches, network gateways, application servers, computer systems, memory, software, processing circuitry, cabling, power supply, network communication interface, structural support, or some other communication apparatus. Wireless network access point 101 could be a base station, Internet access node, telephony service node, wireless data access point, or some other wireless communication system—including combinations thereof.

Wireless links 111-114 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-114 are representative and may include intermediate links, systems, and networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless network access point to select a Device-to-Device (D2D) communication master, the method comprising:
    a wireless access point transceiver wirelessly receiving signal strength reports indicating signal strengths and wirelessly receiving buffer status reports indicating buffer capacities from multiple User Equipment (UEs) that form a D2D communication group;
    wireless access point processing circuitry filtering the signal strengths for the D2D communication group based on a signal strength threshold and filtering the buffer capacities for the D2D communication group based on a buffer capacity threshold to identify a candidate set of the UEs;
    the wireless access point processing circuitry determining buffer status reporting frequencies for the candidate set of the UEs and prioritizing the candidate set of the UEs based on the buffer status reporting frequencies to select one of the UEs having a lower one of the buffer status reporting frequencies as the D2D communication master for the D2D communication group, wherein the lower one of the buffer status reporting frequencies indicates a lower amount of UE errors; and
    the wireless access point transceiver wirelessly transferring D2D signaling to the UEs in the D2D communication group that indicates the selected one of the UEs that is the D2D communication master for the D2D communication group.

2. The method of claim 1 further comprising setting a candidate set timer.

3. The method of claim 1 wherein the wireless network access point comprises a Long Term Evolution (LTE) eNode B.

4. The method of claim 1 wherein the wireless network access point comprises a Wireless Fidelity (WiFi) access point.

5. The method of claim 1 wherein the wireless network access point comprises a wireless relay.

6. The method of claim 1 wherein the multiple UEs comprise wireless relays.

7. The method of claim 1 wherein the signal strength threshold comprises Channel Quality Index (CQI).

8. A wireless network access point to select a Device-to-Device (D2D) communication master:
a wireless network access point transceiver configured to wirelessly receive signal strength reports indicating signal strengths and wirelessly receiving buffer status reports indicating buffer capacities from multiple User Equipment (UEs) that form a D2D communication group;
wireless network access point processing circuitry configured to filter the signal strengths for the D2D communication group based on a signal strength threshold and filter the buffer capacities for the D2D communication group based on a buffer capacity threshold to identify a candidate set of the UEs;
the wireless network access point processing circuitry configured to determine buffer status reporting frequencies for the candidate set of the UEs and prioritize the candidate set of the UEs based on the buffer status reporting frequencies to select one of the UEs having a lower one of the buffer status reporting frequencies as the D2D communication master for the D2D communication group, wherein the lower one of the buffer status reporting frequencies indicates a lower amount of UE errors; and
the wireless access point transceiver configured to wirelessly transfer D2D signaling to the UEs in the D2D communication group that indicates the selected one of the UEs that is the D2D communication master for the D2D communication group.

9. The wireless network access point of claim 8 wherein the wireless network access point is further configured to set a candidate set timer.

10. The wireless network access point of claim 8 wherein the wireless network access point comprises a Long Term Evolution (LTE) eNode B.

11. The wireless network access point of claim 8 wherein the wireless network access point comprises a Wireless Fidelity (WiFi) access point.

12. The wireless network access point of claim 8 wherein the wireless network access point comprises a wireless relay.

13. The wireless network access point of claim 8 wherein the multiple UEs comprise wireless relays.

14. The wireless network access point of claim 8 wherein the signal strength threshold comprises Channel Quality Index (CQI).

15. A computer apparatus to operate a computing system in a wireless network access point to select a Device-to-Device (D2D) communication master, the computer apparatus comprising:
wireless network access point software instructions configured, when executed by the computing system in the wireless network access point, to direct the computing system to wirelessly receive signal strength reports indicating signal strengths and wirelessly receive buffer status reports indicating buffer capacities from multiple User Equipment (UEs) that form a D2D communication group, filter the signal strengths for the D2D communication group based on a signal strength threshold and filter the buffer capacities for the D2D communication group based on a buffer capacity threshold to identify a candidate set of the UEs, determine buffer status reporting frequencies for the candidate set of the UEs and prioritize the candidate set of the UEs based on the buffer status reporting frequencies to select one of the UEs having a lower one of the buffer status reporting frequencies as the D2D communication master for the D2D communication group wherein the lower one of the buffer status reporting frequencies indicates a lower amount of UE errors, and wirelessly transfer D2D signaling to the UEs in the D2D communication group that indicates the selected one of the UEs that is the D2D communication master for the D2D communication group; and
a computing system memory that stores the software instructions.

16. The computer apparatus of claim 15 wherein the software instructions are further configured to direct the computing system to set a candidate set timer.

17. The computer apparatus of claim 15 wherein the computing system comprises a Long Term Evolution (LTE) eNode B.

18. The computer apparatus of claim 15 wherein the computing system comprises a wireless relay.

19. The computer apparatus of claim 15 wherein the multiple UEs comprise wireless relays.

20. The computer apparatus of claim 15 wherein the signal strength threshold comprises Channel Quality Index (CQI).

* * * * *